(12) United States Patent
Yang et al.

(10) Patent No.: US 9,769,296 B2
(45) Date of Patent: *Sep. 19, 2017

(54) TECHNIQUES FOR VOICE CONTROLLING BLUETOOTH HEADSET

(71) Applicant: Wuxi Vimicro Corporation, Wuxi, Jiangsu (CN)

(72) Inventors: David Yang, Wuxi (CN); Jian Chen, Wuxi (CN); Feng Zhu, Wuxi (CN); Yuhong Feng, Wuxi (CN)

(73) Assignee: Zgmicro Wuxi Corporation, Wuxi (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,553

(22) Filed: Jan. 23, 2017

(65) Prior Publication Data

US 2017/0134552 A1 May 11, 2017

Related U.S. Application Data

(63) Continuation of application No. 14/447,596, filed on Jul. 30, 2014, now Pat. No. 9,553,979.

(51) Int. Cl.
*H04M 3/42* (2006.01)
*H04M 1/60* (2006.01)
(Continued)

(52) U.S. Cl.
CPC .......... *H04M 1/6066* (2013.01); *G10L 15/02* (2013.01); *G10L 15/22* (2013.01); *G10L 25/51* (2013.01); *H04M 1/271* (2013.01); *H04M 1/7253* (2013.01); *H04W 4/008* (2013.01); *H04W 4/16* (2013.01); *H04W 8/183* (2013.01); *G10L 2015/223* (2013.01); *H04M 2201/40* (2013.01); *H04M 2242/12* (2013.01); *H04M 2250/02* (2013.01)

(58) Field of Classification Search
CPC .. H04M 1/6066; H04M 1/271; H04M 1/7253; H04M 2250/02; H04M 2201/40; H04M 2242/12; G10L 15/22; G10L 15/02; G10L 25/51; G10L 2015/223; H04W 4/008; H04W 4/16; H04W 8/183
USPC ........... 455/415, 420, 563, 413, 412.1, 41.2, 455/556.1, 456.1; 379/88.13, 211.01, 379/213.01
See application file for complete search history.

(56) References Cited

U.S. PATENT DOCUMENTS

| 9,553,979 B2* | 1/2017 | Yang | ............... H04M 1/6066 |
| 2009/0024394 A1* | 1/2009 | Nakashima | ............ G08G 1/005 704/275 |

(Continued)

*Primary Examiner* — Dhaval Patel
(74) *Attorney, Agent, or Firm* — Joe Zheng

(57) ABSTRACT

Techniques for controlling a personalized Bluetooth device (e.g., headset) and a voice interaction control method thereof are described. According to one aspect of the present invention, the Bluetooth device is caused to maintain a voice contact list. Each item in the voice contact list corresponds to a phone number associated with a set of audio data (e.g., a voice or a predefined audio). Instead of dialing a phone number on a calling device (e.g., a cellular phone) being paired with the Bluetooth device, a user can speak to the Bluetooth device that is caused to search a corresponding phone number in the voice contact list. The number is then sent to the calling device to make a call.

11 Claims, 5 Drawing Sheets

(51) Int. Cl.
    *H04M 1/725*      (2006.01)
    *H04W 4/00*       (2009.01)
    *H04W 4/16*       (2009.01)
    *H04W 8/18*       (2009.01)
    *H04M 1/27*       (2006.01)
    *G10L 15/22*      (2006.01)
    *G10L 15/02*      (2006.01)
    *G10L 25/51*      (2013.01)

(56) References Cited

U.S. PATENT DOCUMENTS

2010/0074420 A1*   3/2010   Bauchot .............. H04M 1/6505
                                                                                      379/88.02
2013/0053009 A1*   2/2013   Yanai .................... H04M 1/578
                                                                                      455/415

* cited by examiner

| Caller Number 1 | User Voice 1 |
| Caller Number 2 | User Voice 2 |
| .. .. | .. .. |
| Caller Number n | User Voice n |

| Caller Number 1 | Reference Template of User Voice 1 |
| --- | --- |
| Caller Number 2 | Reference Template of User Voice 2 |
| .. .. | .. .. |
| Caller Number n | Reference Template of User Voice n |

| Caller Number 1 | User Voice 1 | Reference Template of User Voice 1 |
| --- | --- | --- |
| Caller Number 2 | User Voice 2 | Reference Template of User Voice 2 |
| .. .. | .. .. | .. .. |
| Caller Number n | User Voice n | Reference Template of User Voice n |

*FIG. 6*

TECHNIQUES FOR VOICE CONTROLLING BLUETOOTH HEADSET

BACKGROUND OF THE INVENTION

1. Field of the Invention

The present invention relates to the field of electronics, and in particular, to a personalized Bluetooth device and a voice interaction control method thereof.

2. Description of Related Art

At present, the Bluetooth headset has been used widely. Users often use the Bluetooth headset to monitor whether there is an incoming call to a mobile device, such as a mobile phone or a tablet computer, paired with the Bluetooth headset. When there is an incoming call to the mobile device, the Bluetooth headset may perform voice reminding on the incoming call with methods as follows. The first method is synthesized tone reminding, such as ringtone or beep of a common phone, which may only perform incoming call reminding, without acquiring more information. The second method is to retrieve a phone number of an incoming call, by which a user may hear the number of an incoming call. The caller number is transmitted to the Bluetooth handset from the mobile device via a command specified through a Bluetooth handsfree profile (HFP). However, the user may hardly remember many phone numbers, and in most cases, the number may not bring useful information to the user. The third method is a voice reminding of a name of the caller number recorded in a phone book of the mobile device, by which the user may directly hear the name of the caller in the phone book (if available), and obtain the information of a caller audibly. In this method, a contact name of the phone number obtained by the Bluetooth handset via HFP is inquired and obtained from the phone book of the mobile device by a Bluetooth phone book access profile (PBAP), and then the contact user name is reported through a voice synthesis technology (Text to Voice, TTS).

The third method, however, has disadvantages that both the huge PBAP and the complicated TTS algorithm take a lot of system resources and are not suitable for small embedded-type consumer electronics as Bluetooth headset. Meanwhile, the TTS algorithm is very difficult in supporting different languages, dialects and the like. Whereas for the mobile device not supporting the PBAP, the Bluetooth headset cannot acquire the name of the caller, resulting in that the Bluetooth headset must be in paired use with the mobile device supporting the PBAP. In addition, practices prove that the instability PBAP is present, that is even though both the mobile device and the Bluetooth headset support the PBAP, the instability of the PBAP may lead to unsuccessful phone book access while the mobile device and the Bluetooth headset make use of the PBAP to fulfill the phone book access function.

The Bluetooth headset is relatively small in size and worn on an ear when in normal use. If a display screen or a touch screen was adopted in the Bluetooth headset for man-machine interaction, many problems would be demonstrated, such as high cost, and inconvenience in operation, because the Bluetooth headset off has to be taken off to perform man-machine interaction via the display screen or a touch screen.

For the Bluetooth headset without the display screen or the touch screen, the call making function thereof is very simple, typically, only callback or preset fixed-key number dialing may be realized. It is apparent that the users are far from satisfaction. The users are eager to control the Bluetooth headset to realize call making via voice, thereby thoroughly liberating their hands. Some mobile phone can fulfill a voice control call function, however, this function needs powerful computing resources, tends to consume huge power, and is not suitable for the Bluetooth headset.

Therefore, an improved technical solution is necessarily to be provided to overcome the above problem and other related problems.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention is related to a personalized Bluetooth headset and a voice interaction control method thereof. According to one aspect of the present invention, the Bluetooth headset is caused to maintain a voice contact list. Each item in the voice contact list corresponds to a phone number associated with a set of audio data (e.g., a voice or a predefined audio). When a paired mobile device receives a call, the voice contact list is searched per the caller number. A corresponding audio is played back when an item is located in the voice contact list. As such a user of the Bluetooth headset knows who is calling and determines whether the call shall be answered or not.

According to another aspect of the present invention, different approaches are implemented to acquire the audio data. According to yet another aspect of the present invention, voice control is provided to control the Bluetooth headset.

The present invention can be implemented as an apparatus, a method and a part of a system. According to one embodiment, the present invention is a Bluetooth headset comprising: an audio input module configured for acquiring a chosen voice in the voice contact list establishment mode; a storage module; and a processing module configured to establish a corresponding relationship between the chosen voice and a caller number to create a voice contact list item for the caller number, and store the voice contact list item into the storage module, wherein one or more voice contact list items constitute a voice contact list in the Bluetooth headset.

When a mobile device receives an incoming call, the processing module is further configured to acquire a current caller number from the mobile device based on a Bluetooth handsfree profile, extract the user voice from a voice contact list item corresponding to the current caller number when the voice contact list item has been established for the current caller number, and play back the extracted user voice via the audio output module.

According to another embodiment, the present invention is a method for controlling a Bluetooth headset, the method comprises: entering a voice contact list establishment mode; acquiring a chosen voice; establishing a corresponding relationship between the chosen voice and a caller number of the Bluetooth headset to establish a voice contact list item for the caller number of the Bluetooth headset; and storing the established voice contact list item into a storage module of the Bluetooth headset, wherein one or more voice contact list items forms a voice contact list in the Bluetooth headset.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 6 is a schematic view showing the voice contact list according to still another embodiment of the present invention.

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figures 1, 2:
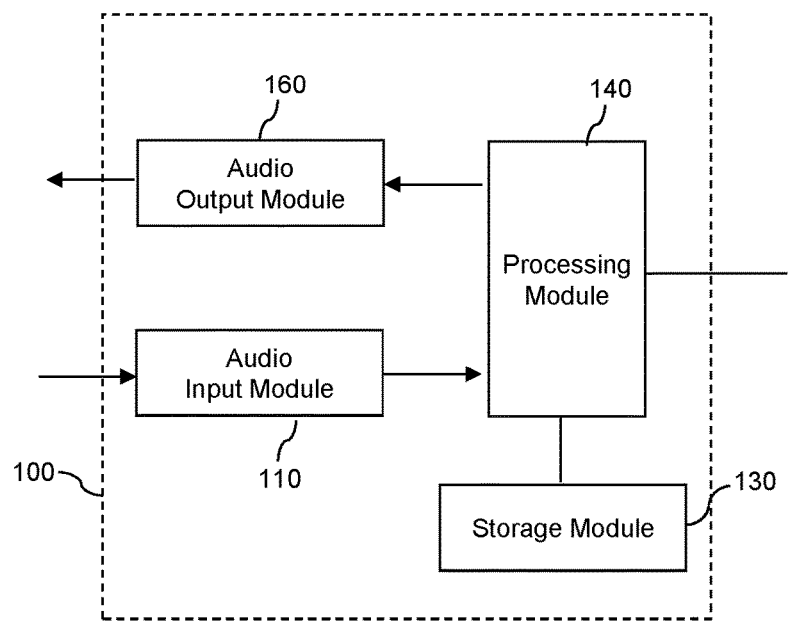
FIG. 1 is a block diagram showing a Bluetooth headset according to one embodiment of the present invention.
FIG. 2 is a schematic view showing a voice contact list according to one embodiment of the present invention.

FIG. 1 shows a functional block diagram 100 and an exemplary Bluetooth headset according to one embodiment of the present invention. Referring to FIG. 1, the Bluetooth headset 100 comprises an audio input module 110, a storage module 130, a processing module 140 and an audio output module 160. The audio input module 110 is configured for acquiring audio data or voice signal. The audio output module 160 is configured for playing the audio data or signal output by the processing module 160.

For the convenience, the improvement of user experience and enrichment of functions of the Bluetooth headset, the Bluetooth headset 100 of the present invention may be designed to support voice interaction control. In one embodiment, the Bluetooth headset 100 may comprise one or several of the voice interaction control functions as follows: firstly, the Bluetooth headset 100 may realize the personalized voice broadcasting according to a caller number; and secondly, the Bluetooth headset 100 may realize a voice control call under various environments based on speech recognition, with very high success rate in speech recognition and very good user experience.

Personalized Voice Broadcasting of Caller Number

According to one embodiment, the Bluetooth headset 100 has a voice contact list establishment mode. A user may cause the Bluetooth headset 100 to enter the voice contact list establishment mode through an instruction input interface (not shown) on the Bluetooth headset 100. The instruction input interface may be either a key or a voice command input interface. The Bluetooth headset 100 may establish a voice contact list item for a caller number of the Bluetooth headset under the voice contact list establishment mode. Under the voice contact list establishment mode, the audio input module 110 is configured to acquire a chosen user voice, which may be the voice of a user reading a name or number in a contact list, the user may express in any language and dialect (such as English, Chinese, or a nick name), the processing module 140 is configured to establish a corresponding relationship between the acquired user voice and a corresponding number to establish a voice contact list item for a contact, and store the voice contact list item in the storage module 130.

It should be noted that before the processing module 140 is configured to store the acquired user voice as the voice contact list item, the acquired user voice may be preprocessed, such as coded (e.g., compressed). The details of coding a voice is not to be further described to avoid obscuring aspects of the present invention. The name of a user herein may represent a username, a code name, a nickname, a title and others representing a contact or a caller.

In one preferred embodiment, because the Bluetooth headset 100 is typically not equipped with a display screen, and is usually configured to cache only the latest caller number. Thus the Bluetooth headset 100 is used to establish the voice contact list item for the latest caller number under the voice contact list establishment mode. For example, after the user answers an incoming call via the Bluetooth headset, the Bluetooth headset which caches the latest incoming caller number may be made to enter the voice contact list establishment mode for the time being, and establish the voice contact list item for the latest caller number.

As shown in FIG. 2, which shows a voice contact list according to one embodiment of the present invention, the voice contact list items have been established for n caller (phone) numbers in the storage module 130 of the Bluetooth headset, wherein a corresponding relationship is formed between a caller number and a user voice. Each pair of the caller number and the user voice may be referred to as a voice contact list item. All the voice contact list items jointly form a voice contact list in the Bluetooth headset of the present invention, and the voice contact list becomes unique due to the inclusion of the personalized voice of the user.

Generally, the Bluetooth headset 100 may establish a wireless connection with a mobile device (not shown), such as a mobile phone and a tablet computer, and replace the mobile device to answer or hang up an incoming call of the mobile device. In one embodiment, after a pairing between the Bluetooth headset 100 and a mobile device is completed, when the mobile device has an incoming call, the processing module 140 is configured to acquire a current caller number from the mobile device based on a Hands-Free Profile (HFP)

specification, and determine whether a voice contact list item has been established for the current caller number in the storage module 130.

The Hands-Free Profile (HFP) specification defines the minimum set of functions such that a Mobile Phone can be used in conjunction with a Hands-Free device (e.g. installed in the car or represented by a wearable device such as a headset), with a Bluetooth® Link providing a wireless means for both remote control of the Mobile Phone by the Hands-Free device and voice connections between the Mobile Phone and the Hands-Free device.

If the voice contact list item has been located for the current caller number in the storage module 130, the processing module 140 is configured to extract the user voice from the contact list item corresponding to the current caller number and transfer the user voice to the audio output module 110 to play. In such a way, the complicated Bluetooth phone book access profile (PBAP) is avoided while the personalized voice reminding of the incoming call is realized, thereby allowing the voice reminding to be free from the limit on whether the mobile device supports the PBAP and the limit on the language type of the reminding voice, and simplicity and low cost are achieved.

If no voice contact list item has been located for the current caller number in the storage module, the Bluetooth headset 100 may broadcast the current caller number directly in a default voice manner, or play a section of predetermined audio data, for example, a section of pre-recorded user voice "phone number with no voice record", or a section of pre-stored music, and may also perform synthesized tone reminding, such as a ringtone or beep of a common phone.

Figures 3, 4:
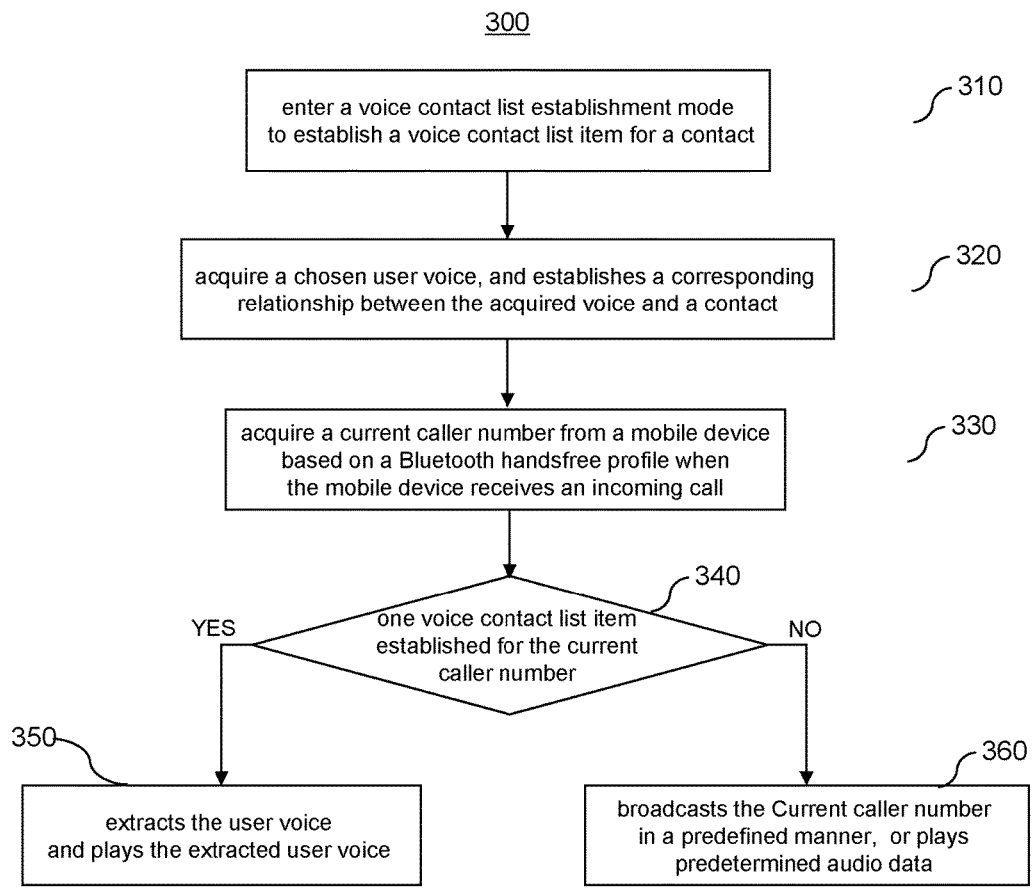
FIG. 3 is a flowchart showing a voice broadcasting method for a caller number of a Bluetooth headset according to one embodiment of the present invention.
FIG. 4 is a schematic view showing the voice contact list according to another embodiment of the present invention.

FIG. 3 shows a flowchart or process 300 of voice broadcasting a caller number of a Bluetooth headset according to one embodiment of the present invention. The process 300 may be implemented in software or a combination of software and hardware. At 310, the Bluetooth headset 100 is drove to enter a voice contact list establishment mode to establish a voice contact list item for a contact or a phone number. The contact may be from an address book or a contact list in the Bluetooth headset 100 or newly created. In one embodiment, the voice contact list item is established for the latest caller number the Bluetooth headset was used to receive.

At 320, under the voice contact list establishment mode, the Bluetooth headset is caused to acquire a section of audio or a user voice corresponding to a contact represented by a corresponding phone number, and establishes a corresponding relationship between the acquired voice and the phone number to form a voice contact list item for the contact (e.g., the phone number).

At 330, after pairing between the Bluetooth headset and a mobile device is completed, the Bluetooth headset acquires a current caller number from the mobile device based on a Bluetooth handsfree profile when the mobile device has an incoming call.

At 340, the process 330 is configured to determine whether one voice contact list item has been located for the current caller number. If YES, the process 330 enters into 350; otherwise, the process 330 enters into 360.

At 350, the Bluetooth headset extracts the user voice from the voice contact list item of the current caller number and plays the extracted user voice when the voice contact list item has been located for the current caller number.

At 360, the Bluetooth headset broadcasts or pronounces the current caller number directly in a voice manner, plays a section of predetermined audio data, or performs a synthesized tone to remind the callee of the caller when the voice contact list item has not been established or located for the current caller number.

According to one embodiment, a latest caller number received in the Bluetooth headset can be readily associated with a voice contact list item. The Bluetooth headset may be put into a mode to acquire the current caller number from the mobile device based on the Bluetooth handsfree profile when the mobile device has an incoming call, and the Bluetooth headset may play the user voice corresponding to the current caller number when the Bluetooth headset has established the voice contact list item for the current caller number. Accordingly, the Bluetooth headset of the present invention has one or several of the advantages as follows. Firstly, personalized reminding may be realized, the user may record various voices (e.g., unique or interesting announcement or voice), and/or in various languages and dialects. Hence the user experience is improved when an incoming call remind is performed based on the Bluetooth headset. Secondly, the complicated Bluetooth phone book access profile may be avoided for the Bluetooth headset, and the voice broadcasting function regarding an incoming call may be realized as long as the Bluetooth headset is in compliance with the Bluetooth handsfree profile. Thirdly, the complicated Test-To-Speech (TTS) does not need to be adopted, thereby reducing cost and power consumption. Meanwhile, there is no limit to the language type. A user can speak in any language he or she prefers. Fourthly, the personalized voice broadcasting function regarding the incoming call may be realized without any modification to the mobile device paired with the Bluetooth headset, thereby decreasing the requirement for the mobile device. That is, even though the mobile device does not support the voice broadcasting reminding of the Bluetooth headset, the personalized voice broadcasting function regarding the incoming call may be still realized by paring the Bluetooth headset with the mobile device as long as the mobile device supports the common Bluetooth handsfree profile (HFP).

Voice Control Call

Similar to the foregoing description about the personalized voice broadcasting regarding the caller number, the Bluetooth headset 100 may establish a voice contact list item for a caller number under the voice contact list establishment mode. The difference lies in that, in this section, the structure of the voice contact list item is subject to some changes, which are described in details in the following.

Under the voice contact list establishment mode, the audio input module 110 acquires chosen audio data, which may be the voice of a user reading a nickname of a user per a phone number, the processing module 140 establishes a reference template based on training of the user voice acquired by the audio input module 110, and establishes a corresponding relationship between the reference template and the caller number to establish a voice contact list item of the caller number, wherein the reference template is a group of reference feature vector sequence includes feature parameters extracted from the corresponding user voice.

Similar to the foregoing description about the personalized voice broadcasting regarding the caller number, when a voice contact list item for a caller number is established under the voice contact list establishment mode, the Bluetooth headset 100 typically establishes a voice contact list item for the latest caller number of the Bluetooth headset.

As shown in FIG. 4, which is a schematic view showing the voice contact list according to another embodiment of the present invention, the voice contact list items have been established for n caller numbers in the storage module 130 of the Bluetooth headset, wherein a corresponding relationship is formed between a caller number 1 and a reference template of a user voice 1, a corresponding relationship is formed between a caller number 2 and a reference template of a user voice 2, a corresponding relationship is formed between a caller number n and a reference template of a user voice n. Each pair of the caller number and the reference template of the user voice with a corresponding relationship may be called as a voice contact list item. All the voice contact list items jointly constitute the voice contact list, which becomes unique due to inclusion of the reference template of the personalized user voice.

The Bluetooth headset 100 further has a voice control call mode. The user may control the Bluetooth headset 100 to enter the voice control call mode through an instruction input interface of the Bluetooth headset 100.

Under the voice control call mode, the audio input module 110 acquires a section of user voice containing an identifier (username) of the user. The user voice is not subject to voice activity detection for the time being, and thus may also be referred as original user voice.

The processing module 140 extracts the object user voice from the acquired user voice through a voice activity detection (VAD). The original user voice acquired in the actual environment of the Bluetooth headset not only includes a voice signal of a speaking user but also includes background noise signals. For providing powerful support to subsequent speech recognition to maintain the success rate of the subsequent speech recognition at higher level all the time, it is very necessary to extract the actual user voice (i.e. the object forgoing user voice) from the acquired user voice (the original voice signal), which is called as voice activity detection.

The processing module 140 generates a test template based on the extracted object user voice, matches the obtained test template with each of the reference templates corresponding respectively to all the caller numbers in the voice contact list to determine a reference template finally matched with the test template. The test template is a group of test feature parameter vector sequence including feature parameters extracted from the object user voice.

The operation of matching the obtained test template and the reference templates corresponding to all the caller numbers in the voice contact list to determine the reference template finally matched with the test template comprises: matching the test module with the reference templates corresponding to all the caller numbers in the voice contact list to generate a matching score between the test template and each reference template; comparing the matching scores of all the reference templates with a preset score threshold value and a preset difference threshold value; and determining the reference template with a minimum matching score to be the reference template finally matched with the test template if a difference value between a sub-minimum matching score and the minimum matching score in the matching scores of all the reference templates is more than the difference threshold value, and the minimum matching score is smaller than the score threshold value.

The processing module 140 sends the caller number corresponding to the reference template finally matched with the test template, as a call number, to the mobile device paired with the Bluetooth headset 100, and the mobile device dials the call number transmitted from the Bluetooth headset 100 to fulfill the voice control call function.

In one application, the Bluetooth headset 100 is paired with the mobile phone of Zhang San. After an incoming call from Wang Peng with the phone number of 1380023457 is answered by using the Bluetooth headset 100, Zhang San hopes to establish a voice contact list item for Wang Pen in the Bluetooth headset 100, and may control the Bluetooth headset 100 to enter the voice contact list establishment mode. Under the voice contact list establishment mode, Zhang San may say the username of Wang Peng in his own way (such as a Sichuan accent), the Bluetooth headset 100 records the user voice of Zhang San, establishes a reference template based on training of the recorded user voice of Zhang San and establishes a corresponding relationship between the reference template and the caller number 1380023457. Thus, the voice contact list item is established for Wang Peng in the Bluetooth headset 100. Under the voice control call mode, the Bluetooth headset 100 may find the reference template finally matched with the test template based on the user voice input signal and the caller number 1380023457 corresponding to the reference template as long as Zhang San says the username of Wang Peng to the Bluetooth headset 100 again, and sends the caller number 1380023457 as a call number to the mobile phone paired with the Bluetooth headset 100, and the mobile phone dials the phone number 1380023457. Thereby, the voice control call function is fulfilled. It should be noted that the user voice forming the reference template and the user voice for speech recognition should be from the same person, such as Zhang San, and this solution is named as an isolated word speaker-dependent speech recognition algorithm. The isolated word refers to the pronunciation manner of the user, and a reference template needs to be established for recognizing each contact in the contact list; and the speaker-dependent refers to that the recognition person and the pronunciation person are the same person, and supports various voices and dialects.

Figure 5:
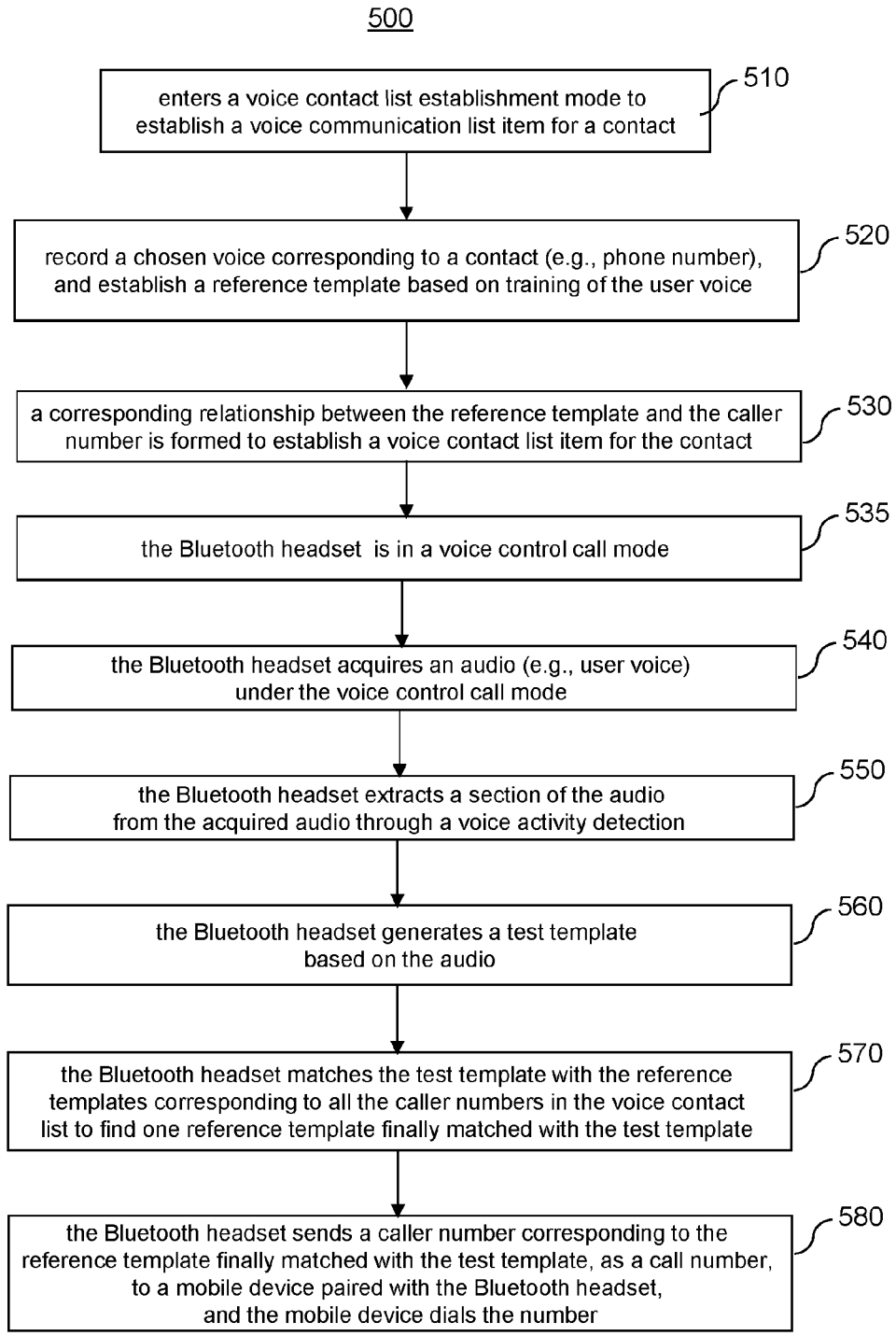
FIG. 5 is a flowchart showing a voice control call method of a Bluetooth headset according to one embodiment of the present invention.

FIG. 5 is a flow chart showing a voice control call method of a Bluetooth headset according to one embodiment of the present invention. Referring to FIG. 5, the method comprises following operations.

At 510, the Bluetooth headset is controlled through an instruction input interface thereof to enter a voice contact list establishment mode to establish a voice communication list item for a caller number of the Bluetooth headset. In one preferred embodiment, the voice contact list item is established for the latest caller number of the Bluetooth headset.

At 520, under the voice contact list establishment mode, the Bluetooth headset 100 records a section of user voice containing a username of a user represented by corresponding caller number, and establishes a reference template based on training of the acquired user voice. The reference template is a group of reference feature vector sequence consisted of feature parameters extracted from the recorded user voice. The user may express the username of the user represented by the caller number in any language and dialect (such as English, Chinese, Sichuan language, etc.).

At 530, a corresponding relationship between the reference template and the caller number is formed to establish a voice contact list item for the caller number. The voice contact list having the reference template is formed in the Bluetooth handset 100 by repeating operations at 510 to 530. At 535, the Bluetooth headset is controlled through the instruction input interface thereof to enter a voice control call mode. At 540, under the voice control call mode, the Bluetooth headset 100 acquires a section of user voice containing a username of a calling user. The user voice before voice activity detection may be referred as original user voice. At 550, the Bluetooth headset 100 extracts the object user voice from the acquired user voice through a voice activity detection (VAD).

The original user voice acquired in the actual environment of the Bluetooth headset not only includes a voice signal of a speaking user but also includes background noise signals. For providing powerful support to subsequent speech recognition to maintain the success rate of the subsequent speech recognition at higher level all the time, it is very necessary to extract the actual user voice (i.e. the object forgoing user voice) from the acquired user voice (the original voice signal), which is called as voice activity detection.

At 560, the Bluetooth headset 100 generates a test template based on the object user voice. The test template is a group of test feature parameter vector sequence consisted of feature parameters extracted from the object user voice. At 570, the Bluetooth headset 100 matches the test template with the reference templates corresponding to all the caller numbers in the voice contact list to find one reference template finally matched with the test template.

The operation of matching the test template with the reference templates comprises: matching the test module with the reference templates corresponding to all the caller numbers in the voice contact list to generate a matching score between the test template and each reference template; comparing the matching scores of all the reference templates with a preset score threshold value and a preset difference threshold value; and determining the reference template with a minimum matching score to be the reference template finally matched with the test template if a difference value between a sub-minimum matching score and the minimum matching score in the matching scores of all the reference templates is more than the difference threshold value, and the minimum matching score is smaller than the score threshold value.

At 580, the Bluetooth headset 100 sends a caller number corresponding to the reference template finally matched with the test template, as a call number, to a mobile device paired with the Bluetooth headset 100, and the mobile device dials the call number to fulfill the voice control call function.

In the Bluetooth headset and the voice control call method 500 thereof in the present invention, a reference template of the user voice corresponding to the latest caller number may be formed for the latest caller number, thereby constituting a voice contact list item of the latest caller number. In such a way, the voice control call may be realized under the voice control call mode through the Bluetooth headset, thereby brining great convenience to the user. Accordingly, the Bluetooth headset and the voice control call method thereof in the present invention have one or several of advantages as follows. Firstly, no matter whether the mobile device supports the voice control call function of the Bluetooth headset, the Bluetooth headset in the present invention may be used to fulfill the voice control call function. Secondly, the voice control call function may be fulfilled through the Bluetooth headset without any modification to the mobile device paired with the Bluetooth headset, thereby decreasing the requirement for the mobile device. Thirdly, the speech recognition is completed in the Bluetooth headset, thus, the Bluetooth headset only needs to transmit a phone number to be called to the mobile device through the Bluetooth related profile, rather than transmitting the user voice, thereby reducing the power consumption of Bluetooth. Fourthly, because the Bluetooth headset stores the voice contact list, even though the user changes a new mobile phone, he/she may still make a call to a familiar friend in a voice manner by using the Bluetooth headset after the Bluetooth headset is paired with the new mobile phone.

Combination of Personalized Voice Broadcasting of Caller Number and Voice Control Call In one embodiment, the Bluetooth headset 100 may support the personalized voice broadcasting of the caller number and the voice control call at the same time. In order to fulfill the functions of the personalized voice broadcasting of the caller number and the voice control call, the most important is to change the structure of the voice contact list.

In this embodiment, when the Bluetooth headset 100 enters the voice contact list establishment mode, the audio input module 110 still needs to acquire a section of user voice, which may be the voice of a user reading a username of a user of the caller number, and the processing module 140 establishes a corresponding relationship between the acquired user voice and the caller number. Further, the processing module 140 may also form a reference template based on training of the user voice acquired by the audio input module, and establish a corresponding relationship between the reference template and the caller number. In such a way, a corresponding relationship is established among the caller number, the user voice and the reference template, which jointly constitute a voice contact list item. Apparently, the voice contact list item as shown in FIG. 6 may be established as long as the user voice is recorded once here, which is very convenient for the user to use.

As shown in FIG. 6, which is a schematic view showing a voice contact list according to another embodiment of in the present invention, the voice contact list items have been established for n caller numbers in the storage module 130 of the Bluetooth headset, wherein a corresponding relationship is formed among a caller number 1, a user voice 1, and a reference template of the user voice 1, a corresponding relationship is formed among a caller number 2, a user voice 2, and a reference template of the user voice 2, a corresponding relationship is formed among a caller number n, a user voice n, and a reference template of the user voice n. Each group of the caller number, the user voice and the reference template of the user voice with a corresponding relationship may be called as a voice contact list item.

After the voice contact list item as shown in FIG. 6 is formed, the Bluetooth headset may realize not only the personalized voice broadcasting function of the caller number as described above, but also the voice control call.

Isolated Word Speaker-Dependent Speech Recognition

The key to fulfillment of the voice control call function is a speech recognition, which generally comprises: reference template training, acquiring a user voice, a voice activity detection, generating of a test template, and matching and recognizing the templates.

According to one embodiment, the forgoing operation 520 relates to the training of the reference template, the forgoing operation 540 relates to acquiring of the user voice, the forgoing operation 550 relates to voice activity detection, the forgoing operation 560 relates to generating of the test template, and the forgoing operation 570 relates to matching and recognizing of templates. Each operation in the speech recognition is preliminarily introduced above, and the following is going to perform detailed introduction one by one.

According to one embodiment, training a reference template at 520 may be implemented as follows. A user reads the username of a user of the caller number to be trained, the Bluetooth headset 100 records a plurality of frames of user voice at this time, and extracts a feature parameter of each frame in the section of user voice. The feature parameter may be 24-dimensional feature parameters constituted by C1-C12 cepstrum component in Mel frequency ceepstrum coefficients (MFCC) and 1-order differential coefficients.

The acquired 24-dimensional feature parameters of all the frames constitute a group of reference feature vector sequence, which may be expressed as $A=\{a_1, a_2, \ldots, a_I\}$, wherein $\alpha$ is the 24-dimensional feature parameters of each frame user voice constituted by C1-C12 cepstrum components and 1-order differential coefficients, and I is the frame number of the last frame of user voice. Generally, the time span corresponding to each frame of user voice is 10~20 ms.

According to one embodiment, the voice activity detection at 550 and generating the test template at 560 may be implemented as follows. The feature parameters are extracted from the object voice signal, and may be 24-dimensional feature parameters constituted by C1-C12 cepstrum component in MFCCs and 1-order differential coefficients, and the extracted 24-dimensional feature parameters constitute a test feature vector sequence which forms the test template. The test template may be expressed as $B=\{b_1, b_2, \ldots, b_J\}$.

One implementation of matching and recognizing of the templates at 570 is to be introduced in the following. Firstly, the matching score of each reference template with the test template is obtained by calculating the 24-dimensional feature parameters in the test feature vector sequence of the test template and the 24-dimensional feature parameters in each reference feature sequence by Dynamic Time Warping algorithm.

Secondly, the matching scores of all the reference templates are compared with a preset score threshold value and a preset difference threshold value. If a difference value between a sub-minimum score and a minimum score in the matching scores of all the reference templates is more than the difference threshold value, and the minimum score is smaller than the score threshold value, the reference template with the minimum score is determined to be the reference template finally matched with the test template, wherein the preset score threshold value may be expressed as threshold_score, and the preset difference threshold value may be expressed as threshold_dist.

In one embodiment, it is assumed that the usernames of four users are trained in a voice contact list, the usernames of the four users may be Zhang San, Li Si, Wang Wu and Zhou Liu. The test feature vector sequence is matched with the reference feature vector sequences of all the reference templates by using a DTW algorithm to obtain a group of matching scores. Provided the matching scores of the reference templates of Zhang San, Li Si, Wang Wu and Zhou Liu are 113, 302, 278 and 269 respectively, 113 is the minimum score in this group of matching scores, the difference value between the minimum score and the sub-minimum score is 269−113=156, supposing that the preset score threshold value threshold_score is 200 and the difference threshold value threshold_dist is 100, the difference value between the minimum score 113 and the sum-minimum score 269 is more than the difference as threshold value 100, and the minimum score 113 is smaller than the score threshold value 200. Thus, the reference template with the minimum score 113, that is, the reference template of Zhang San, is considered to be the reference template finally matched with the test template.

The score threshold value and the difference threshold value may be obtained according to various manners. In one embodiment, the score threshold value and the difference threshold value may be set according to experience, then whether the two threshold values need to be adjusted is determined according to a false recognition rate and a false reject rate. The optimal score threshold value and the optimal difference threshold value are obtained by adjusting the two threshold values.

In one embodiment, in a preset environment, usernames outside the voice contact list and usernames inside the voice contact list are recorded and trained to form test feature vector sequences respectively. The test feature vector sequences are matched with each reference template in a reference template set to generate a score of each test feature vector sequence. A histogram statistical method is used to generate the score threshold value and the difference threshold value. The usernames selected, in a test, inside the voice contact list are Zhang San, Li Si, Wang Wu and Zhou Liu, and the usernames selected, in a test, outside the voice contact list are Zhang Zhan, Li Si, Wang Hu, Zhou Lu and a cough sound, 5 in total.

For example, 20 specific persons are selected, with 10/10 for the male and the female. At first, intra-set command word training is performed in a quiet meeting room environment to obtain a reference template set of the user names in the voice contact list of each specific person. Then, recording is performed in three environments, such as an office, a meeting room and an outdoor environment, and the usernames in each voice contact list may be recorded 10 times, the number of username samples that may be acquired inside the voice contact list is 4*3*10=120 for each specific person, the number of username samples that may be acquired outside the voice contact list is 5*3*10=150 for each specific person, and the number of the samples acquired by each specific person in total is 270. Specific to each specific person, DTW matching calculation may be performed on the 270 samples, and the 270 samples are matched with the reference template set of the corresponding specific person to obtain 270 groups of matching scores. 20 specific persons may obtain 270*20=5400 groups of matching scores. Then, the minimum score and the difference value between the minimum score and the sub-minimum score in each group of matching scores are obtained through statistics based on the 5400 groups of matching scores, and a histogram statistical method may be used to analyze the distribution of the minimum score and the difference value between the minimum score and the sub-minimum score in the matching scores of the intra-set commands and extra-set commands, thereby obtaining the score threshold value and the difference threshold value.

In one embodiment, the parameter value threshold_score is 200, and the parameter value threshold_score is 100, the recognition rate of the intra-set is 95%, and the reject rate of the extra-set is 95%. When the traditional single threshold method is adopted, that is when the parameter value of threshold_score is 200, the recognition rate of the intra-set is 95%, and the reject rate of the extra-set is 70%. Apparently, after a dual-threshold determination method is adopted, the false recognition rate of the extra-set is reduced to 5% from 30% on the premise of guaranteeing the recognition rate of the intra-set is not reduced.

In the speech recognition solution used in the present invention, by means of setting the score threshold value and the difference threshold value, the false recognition rate of the extra-set words may be reduced, thereby realizing lower false recognition rate and lower false reject rate during isolated word speaker-dependent recognition, and achieving better user experience.

Offline Voice Activity Detection

Voice activity detection plays an important role in the speech recognition application, and a good voice activity detection algorithm may provide good system robustness, allow the speech recognition rate to be maintained on the same level almost without changes no matter which environment the user is in. At present, a real-time voice activity detection algorithm is generally adopted for the isolated word speech recognition. By adopting the real-time voice activity detection, the recognition may be performed immediately after the user finishes the speech, and no delay may be felt. However, this method is more sensitive to noises, when non-stationary noises, such as human voice, music sound and other noises with higher interference, exist in the outside environment, a great influence is brought to the voice activity detection algorithm, and the probability of falsely determining a starting point and a finishing point of the voice of an isolated word is very high. Therefore, the voice activities of the isolated word are very difficult to detect accurately in the event of higher noises when the real-time activity detection algorithm is adopted.

Figure 7:
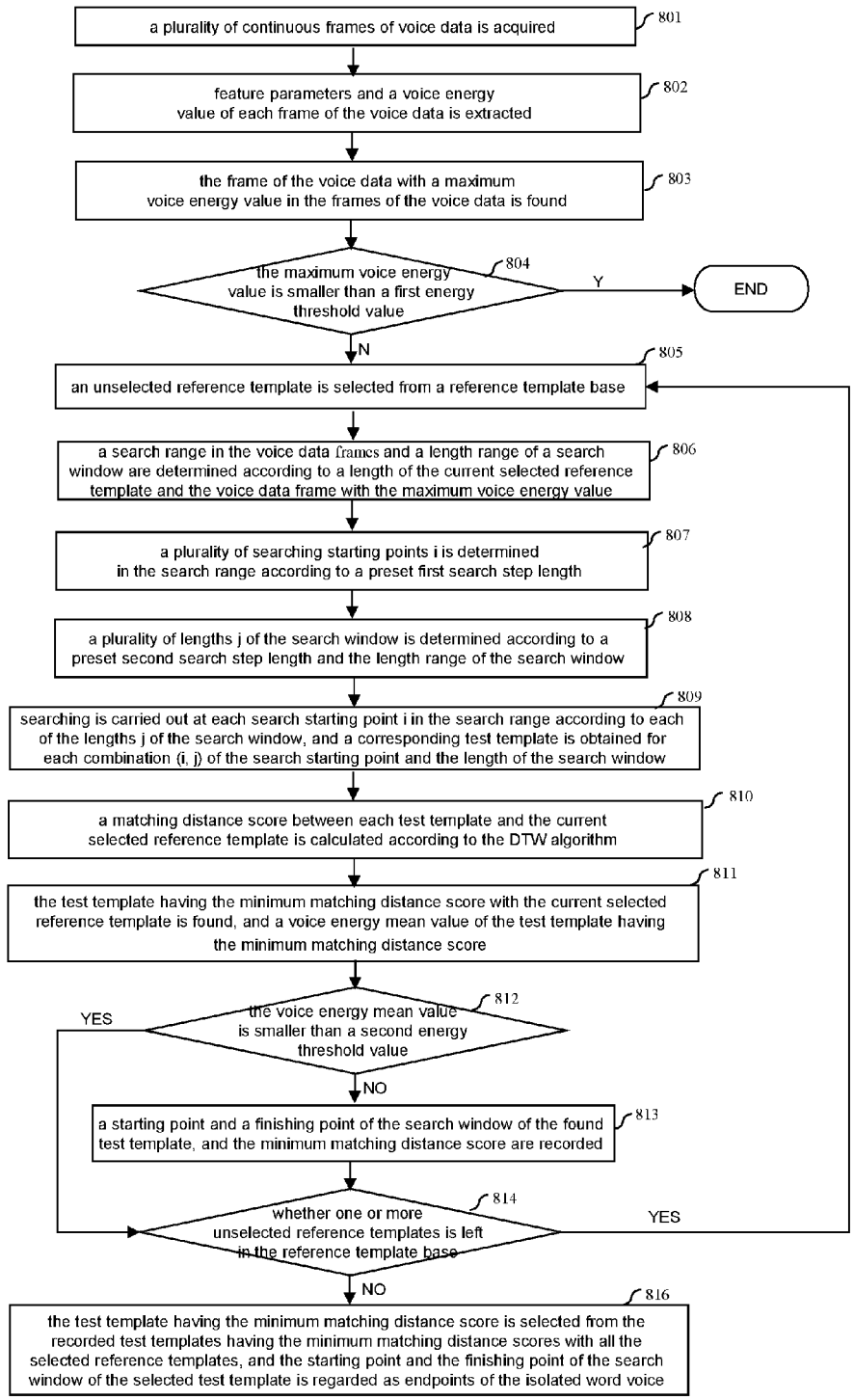
FIG. 7 is a flowchart showing an offline voice activity detection method according to one embodiment of the present invention.

The present invention provides an offline voice activity detection method, as shown in FIG. 7, which may be used in the forgoing operation 550, and comprises the following operations. At 801, a plurality of continuous frames of voice data is acquired. In one embodiment, the Bluetooth headset 100 acquires a voice signal, which is subjected to analog/digital conversion to form voice data and then subjected to PCM coding to obtain PCM data, and the PCM data are processed in terms of frame.

At 802, feature parameters and a voice energy value of each frame of the voice data is extracted. The feature parameters comprise reference feature vectors, which may include, but not limited to, Mel frequency cepstrum coefficient (MFCC) or linear predication coefficient (LPC).

At 803, the frame of the voice data with a maximum voice energy value in the frames of the voice data is found. At 804, whether the maximum voice energy value is smaller than a first energy threshold value is determined. If the maximum voice energy value is not smaller than the first energy threshold value of the voice energy, the offline voice activity detection method is continued at 805; otherwise, the offline voice activity detection method is ended directly.

At 805, an unselected reference template is selected from a reference template base. The reference template base consists of one or more reference templates obtained through training. The training process of the reference templates has been described above, and no more repetition here.

At 806, a search range in the voice data frames and a length range of a search window are determined according to a length of the current selected reference template and the voice data frame with the maximum voice energy value.

In one embodiment, the voice data frame with the maximum voice energy value is taken as a center and then expansion is performed towards the beginning direction and finishing direction of the voice data, and the length of the current selected reference template is taken as a reference of an expansion length to finally determine the search range. The length of the current selected reference template is expressed by L, and in a specific example, the search range may be formed by expanding towards two directions by one L respectively with the voice data frame with the maximum energy value as a center. In another example, the expansion may be performed to two directions by 2L. The relationship between the size of the search range and L may be set as required.

Further, the length of the search window is determined according to the length L of the current selected reference template, for example, the length range of the search window is [0.5L, 2L].

At 807, a plurality of searching starting points i is determined in the search range according to a preset first search step length. To be specific, in the search range, a new search starting point i is obtained by stepping one first search step length S1 every time from an endpoint of the search range on, thereby determining all the search starting points i in the search range.

At 808, a plurality of lengths j of the search window is determined according to a preset second search step length and the length range of the search window. To be specific, as described above in Step 806, provided that the length range of the search window is [0.5L, 2L], and the second search step length in this range is S2, the lengths j of the search window are 0.5L, 0.5L+S2, 0.5L+2S2, 0.5L+3S2 . . . 2L, respectively.

The first search step length S1 and the second search step length S2 may be set to be the same or different respectively as required. They take frame as a unit respectively, and for example, may be set to be 1 frame, 2 frames, 5 frames and etc.

At 809, searching is carried out at each search starting point i in the search range according to each of the lengths j of the search window, and a corresponding test template is obtained for each combination (i, j) of the search starting point and the length of the search window.

To be specific, the length j of the search window is gradually changed for each determined search starting point, and searching in sequence according to j=0.5L, 0.5L+S2, 0.5L+2S2, 0.5L+3S2 . . . 2L, thereby obtaining a corresponding test template for each determined (i, j).

When both the first step length S1 and the second step length S2 are 1 frame, the search is performed one point by one point in a moving manner. At 810, a matching distance score between each test template and the current selected reference template is calculated according to the DTW (Dynamic Time Warping, DTW) algorithm. At 811, the test template having the minimum matching distance score with the current selected reference template is found, and a voice energy mean value of the test template having the minimum matching distance score.

At 812, whether the voice energy mean value of the test template having the minimum matching distance score is smaller than a second energy threshold value. If so, the method is led to 814; otherwise, the method is led to 813. At 813, a starting point and a finishing point of the search window of the found test template having the minimum matching distance score with the current selected reference template is recorded, and the minimum matching distance score of the test template with the current selected reference template is recorded.

At 814, whether one or more unselected reference templates is left in the reference template base. If so, the method is led to 816; otherwise, the method is returned to 805. At 816, the test template having the minimum matching distance score from the recorded test templates having the minimum matching distance scores with all the selected reference templates is selected, and the starting point and the finishing point of the search window of the selected test template is regarded as endpoints of the isolated word voice, that is to say the object user voice for speech recognition is found.

It is necessary to note that if the reference template base only includes one reference template and the voice energy mean value of the test template having the minimum matching distance score with the reference template is not smaller than a second threshold value, the starting point and the finishing point of the search window of the test template having the minimum matching distance score are directly taken as endpoints of the isolated word voice at 816. However, if the voice energy mean value of the test template having the minimum matching distance score is smaller than the second threshold value, operation 816 will be skipped, and it is believed that no effective voice data are recognized, and the offline voice activity detection is ended. With the offline voice detection method provided according to one embodiment of the present invention, the voice activities of the isolated word may be detected accurately and effectively.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A method for voice controlling a Bluetooth device, the method comprises:
   acquiring a speech from a user via an input module of the Bluetooth device, the speech including an identifier identifying a person to be called;
   generating a test template based on the acquired speech, wherein the test template is a group of feature parameters extracted from the acquired speech;
   matching the test template against reference templates corresponding respectively to phone numbers in a voice contact list maintained in the Bluetooth device to find one reference template closely matched with the test template, wherein the voice contact list is created in advance by the user; and
   sending a calling phone number corresponding to the reference template closely matched with the test template to a mobile device being paired with the Bluetooth device to make a call with the calling phone number.

2. The method as recited in claim 1, wherein said matching the test template against reference templates corresponding respectively to phone numbers in a voice contact list maintained in the Bluetooth device to find one reference template closely matched with the test template comprises:
   matching the test template with each of the reference templates to generate matching scores between the test template and the reference templates;
   comparing the matching scores respectively with a preset score threshold; and
   determining one of the reference templates with a maximum matching score to be the reference template closely matched with the test template.

3. The method as recited in claim 1, further comprising:
   causing the Bluetooth device to enter a mode of updating the voice contact list;
   providing a phone number, the phone number being from a last call received in a device paired with the Bluetooth device;
   receiving in the Bluetooth device an audio from the user; and
   pairing the audio with the phone number so that the audio is played back when another device being paired with the Bluetooth device receives a call from the phone number.

4. The method as recited in claim 3, wherein the audio is processed to generate one of the reference templates corresponding to the phone number.

5. The method as recited in claim 3, wherein the audio is in any language.

6. The method as recited in claim 3, wherein the audio is in a dialect spoken by a user.

7. The method as recited in claim 3, wherein the audio is related to announcing a name associated with the phone number.

8. The method as recited in claim 3, further comprising:
   acquiring the phone number from the device based on a Hands-Free Profile (HFP) specification; and
   determining whether a corresponding audio has been established for the phone number in the audio table.

9. A method for a mobile device to make a phone call, the mobile device being paired with a Bluetooth device including a voice contact list, the method comprises:
   receiving a calling number from the Bluetooth device, wherein the Bluetooth device locates the calling number from the voice contact list maintained therein based on a speech from a user via an input module of the Bluetooth device, the speech including an identifier identifying a person to be called, wherein the Bluetooth device is configured to perform operations of:
      generating a test template based on the acquired speech, wherein the test template is a group of feature parameters extracted from the acquired speech;
      matching the test template against reference templates corresponding respectively to phone numbers in a voice contact list maintained in the Bluetooth device to find one reference template closely matched with the test template, wherein the voice contact list is created in advance by the user; and
      sending the calling phone number corresponding to the reference template closely matched with the test template to the mobile device to make a call with the calling phone number.

10. The method as recited in claim 9, wherein said matching the test template against reference templates corresponding respectively to phone numbers in a voice contact list maintained in the Bluetooth device to find one reference template closely matched with the test template comprises:
   matching the test template with each of the reference templates to generate matching scores between the test template and the reference templates;
   comparing the matching scores respectively with a preset score threshold and a preset difference threshold; and
   determining the reference template with a minimum matching score to be the reference template closely matched with the test template.

11. The method as recited in claim 3, wherein the device is the another device.

* * * * *